Patented Aug. 5, 1924.

1,503,825

UNITED STATES PATENT OFFICE.

HANS GOLDSCHMIDT AND GUSTAV SCHÖNWALD, OF BERLIN, GERMANY, ASSIGNORS TO GESELLSCHAFT FÜR ALUMINOTHERMIE, OF BERLIN, GERMANY.

METHOD OF WELDING METALS.

No Drawing.  Application filed June 8, 1922. Serial No. 566,849.

*To all whom it may concern:*

Be it known that we, HANS GOLDSCHMIDT and GUSTAV SCHÖNWALD, citizens of Germany, and residents of Berlin, Germany, have invented new and useful Improvements in Methods of Welding Metals (for which applications have been filed in Germany April 9th, 1921, July 16th, 1921, and in Italy January 5th, 1922), of which the following is a specification.

This invention relates to a method of welding metal bars by the fusion of iron by the thermo-aluminic process.

Heretofore it has been proposed to bring the ends of the metal bars to welding heat by means of the reacting thermo-aluminic mixture, e. g., thermit and to effect the welding by mechanical pressure or in like manner. The fused metal has also been used to unite parts of the profile or side surfaces of the metal bars by causing it to flow around the same and thus strengthen the joint. It is also known to unite the ends of metal bars, particularly in the case of street car rails by moulding the metal around the same or by pouring it into the joint. For this purpose the ends of the rails are set at a distance of from fifteen to twenty-five millimeters apart, enclosed in a mould which is heated, whereupon the fused metal is poured into the mould. The rails are thus completely softened and refused by the molten iron. This method also involves the use of considerable quantities of the thermo-aluminic mixture even when twenty-five to fifty per cent of preheated iron shot is added to the mixture. It is found that approximately nine to thirteen kilograms of thermo-aluminic mixture are required for each rail joint.

The object of the present invention is to reduce the consumption of the thermo-aluminic mixture as much as possible.

According to the present invention, the end faces of the metal bars are brought into close proximity, the gap or distance between the faces to be joined being reduced to about one fifth to one tenth of the distance between the faces heretofore usual. The joint is enclosed in a mould such that the protuberances at the joint are reduced to a minimum. The consequent reduction of the welding surface necessitates preheating of the ends or surfaces of the parts to be joined to as high a temperature as possible and the process therefore consists in preheating the parts to be joined, e. g., the ends of the rails to as high a temperature as possible within the mould and pouring the molten iron into the joint and mould.

It is desirable to employ a thermo-aluminic mixture having as high thermo-aluminic properties as possible, that is to say, a thermo-aluminic mixture to which little or no additional iron has been added.

By this method the end faces of the rails or metal bars are brought to approximately welding temperature so that they are immediately united by the highly heated fused iron, the latter solidifying at the welding temperature.

The economy in the thermo-aluminic mixture is very considerable as it has been found that the quantity of mixture can be reduced to approximately one third or one fourth of that previously required. The rails can either be firmly embedded in carrying out this process or, where possible, they may be clamped by means of a suitable clamping device. The surface of the rails is not appreciably softened by the fused iron and consequently a much firmer and permanent weld is obtained.

In order to reduce the consumption of the thermo-aluminic mixture as far as possible, it is desirable to preheat as little as possible of the rail or bar and to confine the welding almost entirely to the joint faces i. e. the surfaces to be joined. In the known processes a considerable part of the rails on each side of the joint is highly heated which not only involves an unnecessary consumption of the thermo-aluminic mixture, but also gives rise to internal strains in the rails.

It is therefore preferable, according to the present invention, to highly heat the joint without at the same time heating the portion of the rails or other parts to be joined adjacent to the joint. It is not possible, however, to effect the preheating of the joint i. e. the surfaces to be joined in a very small mould, for the reason that sufficient space is not afforded for the expansion of the gases. Moreover the preheating would occupy considerable time and consume a large quantity of liquid fuel such as benzol and the like.

It is therefore desirable to surround the joint with a mould or chamber of sufficient dimensions to obtain efficient preheating of the ends of the rails or other surfaces to be joined. This has the advantage also that the same mould can be repeatedly used. The mould may be either of clay, cast iron, cast steel, or metal plate having a refractory lining such as asbestos or of any other suitable material.

It has been found for example that to sufficiently preheat an ordinary street car rail approximately one kilogram of benzol is required and the preheating is completed in about twenty to thirty-five minutes according to the size of the rail.

After the rail ends have been heated in the preheating mould, the joint is preferably enclosed in a welding mould of similar size to that of the parts to be joined and which may be formed from any suitable plastic material which is placed over the preheating mould and dried by the waste gases therefrom. This method avoids the necessity of a furnace heretofore required for drying the mould.

The changing of the moulds can be effected very rapidly so that very little heat is lost.

Although a certain amount of the molten metal overflows the joint, the amount is so small that the portions of the rails adjoining the ends are only heated to a slight extent.

It is not essential however that the metal forming the joint should all be introduced into the joint by pouring. The head of the rail may be butt-welded by inserting in the joint a plate of any desired thickness, for example, from one half to six millimeters in thickness and then preheating the joint in a preheating mould as already described. The welding mould is then formed at the top of the rail so that it contains the whole of the slag whilst the welding by means of the fused iron reaches from the foot and web of the rail to the top thereof. The economy in thermo-aluminic mixture is therefore ensured by the utilization of the slag. The ends of the rails are thus formed with an overflowing welded joint of fused iron at the foot, web, and up to the head of the rail without the end portions of the rails adjacent to the joint being overheated, so that the possibility of cracks due to shrinkage or other breakages is obviated.

It is also possible to dispense with the intermediate plate in the joint and to produce a slight overlap of fused iron, thus forming a slight strengthening of the butt joint, the strengthening extending over a breadth of about twenty to twenty-five millimeters and being a thickness of from five to fifteen millimeters. This quantity of fused iron is sufficient to bring the welding surface to welding temperature when the rails are sufficiently preheated.

The two moulds may also be used to produce a true butt weld, without any protuberances, by emptying the crucible from above instead of opening the crucible below. In this case the slag will first of all be decanted and the molten iron flowing thereafter will not come in direct contact with the rails. In this case also the joint is previously heated in a larger mould and the casting of the weld is effected in a mould of smaller dimensions.

The joint may also be produced by hard soldering by inserting, for example, a copper plate or a copper plated metal sheet or a sheet of hard solder in the joint across the entire end faces of the rails in which case still less thermo-aluminic mixture is required.

Finally the method can be still further simplified by dispensing with the use of a crucible and utilizing a so-called "sinterthermit." In this case also the preheating is effected in a preheating mould and the reaction with the "sinterthermit" is effected in a second or welding mould.

The invention herein above described was disclosed in substantially the same form and terms in an application for Letters Patent of the United States heretofore filed in the name of Hans Goldschmidt on September 2nd, 1921, Serial No. 497,996, and this application constitutes a continuation of that application so far as concerns said Goldschmidt.

Claims:

1. The method of uniting metal parts which consists in substantially enclosing the surfaces to be joined, circulating highly heated gas over said enclosed surfaces to preheat them to substantially welding temperature, then placing around said highly heated surfaces a mould of reduced content which engages the sides of said parts and extends in close proximity to the edges of said surfaces to be joined and introducing into said mould molten metal, while said surfaces to be joined are in close proximity therein.

2. A method of welding metal parts by the thermo-aluminic process which consists in bringing faces of the metal parts into close proximity, enclosing the joint and ends of the parts in a preheating mould, preheating the same in said mould to substantially welding temperature, enclosing the joint in a welding mould of smaller size and introducing the molten metal into the joint and welding mould.

3. A method of welding metal parts which consists in first highly heating the surfaces thereof to be joined, and heating by means of the waste heat from said heating operation a mould of restricted content which when placed upon the parts to be joined will engage said parts adjacent to and extend in close proximity to, the edges of the surfaces to be joined, then placing said mould around said highly heated surfaces, and introducing molten metal into said mould while said surfaces are in close proximity therein.

4. The method of uniting metal parts by the thermo-aluminic process which consists in substantially enclosing the surfaces to be joined in a chamber of such internal contour and volume as to permit free expansion of gas about said surfaces and to protect substantially all other portions of said parts from gases within said chamber, preheating said surfaces to substantially welding temperature by circulation within said chamber of highly heated gas, substantially enclosing said surfaces in a mould engaging the sides of said parts and extending in close proximity to the edges of said surfaces and introducing the molten metal into said mould, while said surfaces to be joined are in close proximity therein.

5. The method of uniting metal parts which consists in substantially enclosing the surfaces to be joined, circulating highly heated gas over said enclosed surfaces to preheat them to substantially welding temperature, introducing molten metal between said surfaces and confining said molten metal during introduction thereof to substantially the space between said surfaces, while said surfaces to be joined are in proximity.

6. The method of uniting metal parts by the thermo-aluminic process which consists in substantially enclosing the surfaces to be joined in a chamber of such internal contour and volume as to permit free expansion of gas about said surfaces, preheating said surfaces to substantially welding temperature by circulation within said chamber of highly heated gas, introducing the molten metal between said surfaces and confining said molten metal during the introduction thereof to substantially the space between said surfaces to be joined, while said surfaces are in proximity.

7. The method of uniting metal parts by the thermo-aluminic process which consists in substantially enclosing the surfaces to be joined in a chamber of such internal contour and volume as to permit free expansion of gas about said surfaces, preheating said surfaces to substantially welding temperature by circulation within said chamber of highly heated gas substituting for said gas confining chamber a mould for confining fused metal to substantially the space between said surfaces and introducing into said mould superheated fused metal while said surfaces are in close proximity therein.

8. The method of uniting metal parts which consists in substantially enclosing the surfaces to be joined, circulating a stream of highly heated gas over said enclosed surfaces to highly heat them, and heating a mould formed of plastic material by the gases employed in said chamber, substituting said mould for said chamber and introducing superheated fused metal into said mould while said surfaces are in close proximity therein.

In testimony whereof, we have signed our names to this specification.

HANS GOLDSCHMIDT.
GUSTAV SCHÖNWALD.

Witnesses:
S. HALTENRANGE,
R. L. ANSPACE.